United States Patent
Masuda et al.

(10) Patent No.: US 6,561,703 B2
(45) Date of Patent: May 13, 2003

(54) LIGHT SHUTTER DEVICE

(75) Inventors: Tomohiko Masuda, Otsu (JP); Itaru Saito, Nishinomiya (JP); Tsukasa Yagi, Kobe (JP); Yuji Kamoda, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/838,394

(22) Filed: Apr. 19, 2001

(65) Prior Publication Data

US 2001/0038756 A1 Nov. 8, 2001

(30) Foreign Application Priority Data

May 26, 2000 (JP) ........................................ 2000-125703

(51) Int. Cl.[7] .............................. G02F 1/07; G02F 1/03; G02F 1/1333
(52) U.S. Cl. ........................ 396/457; 359/271; 359/323; 349/56
(58) Field of Search ................................ 396/249, 262, 396/457, 506, 452; 344/2, 3, 4, 86; 359/271, 254, 322, 323, 237, 245, 276, 251, 255, 256, 258, 315, 319, 320

(56) References Cited

U.S. PATENT DOCUMENTS 4,887,104 A * 10/1989 Kitano et al. ................ 359/246
6,347,894 B1 * 2/2002 Yagi et al. .................... 396/457

FOREIGN PATENT DOCUMENTS

| JP | 58-095320 | 6/1983 |
| JP | 58-130321 | 8/1983 |
| JP | 60-159722 | 8/1985 |
| JP | 06-011674 | 1/1994 |

* cited by examiner

Primary Examiner—David M. Gray
Assistant Examiner—Rochelle Blackman
(74) Attorney, Agent, or Firm—Sidley Austin Brown & Wood LLP

(57) ABSTRACT

In a light shutter device in which multiple light shutter elements are located on a substrate made of PLZT, and the ON/OFF control of light is carried out by having an electrical field operate on each light shutter element from a pair of electrodes, the cross-talk phenomenon occurs among adjacent elements on the PLZT substrate, i.e., the elements (13c), (13e) and (13g). In order to effectively prevent such cross-talk, driving is carried out such that an electrical field does not operate on such elements simultaneously as a practical matter. In other words, the one line cycle is divided into periods (a) and (b), and the element (13e) is turned ON during the period (a) while the other elements (13c) and (13g) are turned ON during the period (b). Through this operation, a light shutter device in which each element has a stable amount of pass-through light may be obtained.

20 Claims, 7 Drawing Sheets

LIGHT SHUTTER DEVICE

This application is based on application No. JP 2000-125703 filed in Japan, the contents of which is hereby incorporated by reference.

BACKGROUND OF THE INVENTION

1. Field of the Invention

The present invention relates to an improved light shutter device, and more particularly, to an improved light shutter device driving method Specifically, it relates to a light shutter device driving method, and more particularly, to a light shutter device that comprises multiple light shutter elements located on a substrate made of a material having an electro-optical effect, wherein the ON/OFF control of light is carried out through the action on each light shutter element of an electrical field generated from a pair of electrodes, as well as to a driving method for such light shutter device.

2. Description of the Related Art

Various light shutter devices are provided that comprise light shutter substrates made of PLZT, a material that has an electro-optical effect, in an array and in which light is turned ON/OFF on an individual pixel basis in order to form an image on photographic paper or film using a silver halide material or on an electronic photosensitive medium.

A specific principle is shown in FIG. 9. When no voltage is applied to the pair of electrodes 14 and 15 located on the light shutter chip 12, the incident light is blocked by the polarizer 5 located in front of the light shutter chip and the analyzer 7 located on the light exit side, and therefore such light does not exit from the chip. When a voltage is applied to the electrodes 14 and 15, double refraction occurs in the light that enters the PLZT. The light that enters the light transmitting area (light shutter element) 13 through the polarizer 5 is polarized 90 degrees by the light shutter chip 12 such that the light passes through the analyzer 7. Through this operation, the light shutter device turns ON/OFF.

One example of the electrode construction on the conventional light shutter chip 12 is shown in FIG. 10. In this chip 12, light shutter elements 13 (13a, 13b . . . ) are alternately located on the lines X, X that divide the one line image data into two, a common electrode 14, which is connected to ground and is formed therebetween, and individual electrodes 15 (15a, 15b . . . ), to each of which a prescribed voltage is individually applied and which are formed such that the light shutter elements 13 are situated between the individual electrodes 15.

In each light shutter element, the largest amount of pass-through light may be obtained when the incident light is polarized by 90 degrees. The voltage applied to cause this polarization is called half-wavelength voltage. Therefore, driving of this type of light shutter element is carried out using the half-wavelength voltage with which the pass-through light amount is maximized, but a phenomenon occurs in which the half-wavelength voltage and pass-through light amount fluctuate due to the effect of the electrical fields that extend from the adjacent elements (in this specification, this phenomenon is called cross-talk).

For example, to focus on one element 13e in FIG. 10, the lit state (i.e., the amount of pass-through light) of the element 13e should be determined based on the voltage (electrical field) applied to the individual electrode 15e and the common electrode 14. However, when the elements 13c and 13g that are adjacent to the element 13e on the line X are also lit, the electrical fields from the individual electrodes 15c and 15g also extend to the element 13e. Consequently, the half-wavelength voltage by which to drive the element 13e and the amount of pass-through light passing therethrough undergo changes depending on the ON/OFF state of the adjacent elements 13c and 13g.

Such cross-talk does not ordinarily take place between elements that face each other across the common electrode 14, because the common electrode 14 operates as an electrical field barrier. However, where the common electrode 14 is narrow, it is possible for the electrical fields from the individual electrodes 15d and 15f that face the element 13e across the common electrode 14 to extend to the element 13e, causing a cross-talk phenomenon.

FIG. 11 shows the relationship between the voltage applied to the target element 13e and the amount of pass-through light passing therethrough. FIG. 12 shows the waveforms of the voltages applied to the elements 13c, 13e and 13g, respectively, and the photoresponse waveform of the element 13e for each one line image draw cycle.

Characteristic A shown in FIG. 11 indicates the case in which both the adjacent elements 13c and 13g, as well as the element 13e, are simultaneously turned ON, and corresponds to the first cycle in FIG. 12. Characteristic B indicates the case in which either adjacent element 13c or 13g is turned ON, and corresponds to the second or third cycle in FIG. 12. Characteristic C indicates the case in which both adjacent elements 13c and 13g are turned OFF, and corresponds to the fourth cycle in FIG. 12.

As is clear from these characteristics A, B and C, the half-wavelength voltage and the pass-through light amount of the element 13e change depending on the states of operation of the adjacent elements 13c and 13g. For example, where the element 13e is driven using the half-wavelength voltage (approximately 142V) when the elements 13c and 13g are simultaneously turned ON, if either element 13c or 13g is OFF, the element 13e pass-through light amount is reduced by approximately 5%, and if both of the elements 13c and 13g are OFF, the element 13e pass-through light amount is reduced by approximately 16%.

OBJECTS AND SUMMARY

The present invention was made in view of these circumstances, and an object hereof is to provide an improved light shutter device. Another object of the present invention is to provide an improved light shutter device driving method. More specifically, an object of the present invention is to provide a light shutter device and driving method therefor in which the cross-talk phenomenon in which the light shutter elements affect each other may be effectively prevented and the amount of pass-through light of each light shutter element is stabilized.

In order to attain these and other objects, one aspect of the present invention is a driving method for a light shutter device comprising multiple light shutter elements located on a substrate made of a material having an electro-optical effect, wherein light is controlled to turn ON/OFF through the action of an electrical field generated from a pair of electrodes on each light shutter element, and wherein an electrical field does not operate essentially simultaneously on light shutter elements as to which the cross-talk phenomenon occurs in their respective electrical fields.

In the driving method pertaining to the above aspect, an electrical field does not operate essentially simultaneously on light shutter elements that experience a mutual cross-talk effect. Therefore, each light shutter element can obtain a constant amount of pass-through light at all times based on the application of a constant voltage to the electrodes, resulting in the formation of high-quality images.

The concept that 'an electrical field does not operate essentially simultaneously' includes the case in which the effect of cross-talk does not appear in the image as a practical matter even if the electrical fields of the elements overlap slightly, as well as the case in which the actions of each electrical field on each light shutter element are completely separate from each other.

In order to perform driving while ensuring that each electrical field does not affect more than one element at the same time, it is preferred from the viewpoint of simplified driving that one line cycle be divided into at least two periods and that the light shutter elements that experience mutual cross-talk be alternately turned ON in each period. If light shutter elements that are arranged at a 1/2 line pitch difference are alternately turned ON in each of the two periods of one line cycle, the cross-talk phenomenon, as well as minute discrepancies in one line image, may be eliminated through simplified driving.

In addition, it is also acceptable if a large number of pulses are supplied per line cycle and if each pulse is allocated such that adjacent elements are not turned ON at the same time. Although this method entails a higher drive frequency, it allows cross-talk and minute discrepancies in one line image to be eliminated.

BRIEF DESCRIPTION OF THE DRAWINGS

These and other objects and features of the present invention will become apparent from the following description of a preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The embodiments of the light shutter element driving method according to one aspect of the present invention are explained below with reference to the accompanying drawings.

Figure 1:
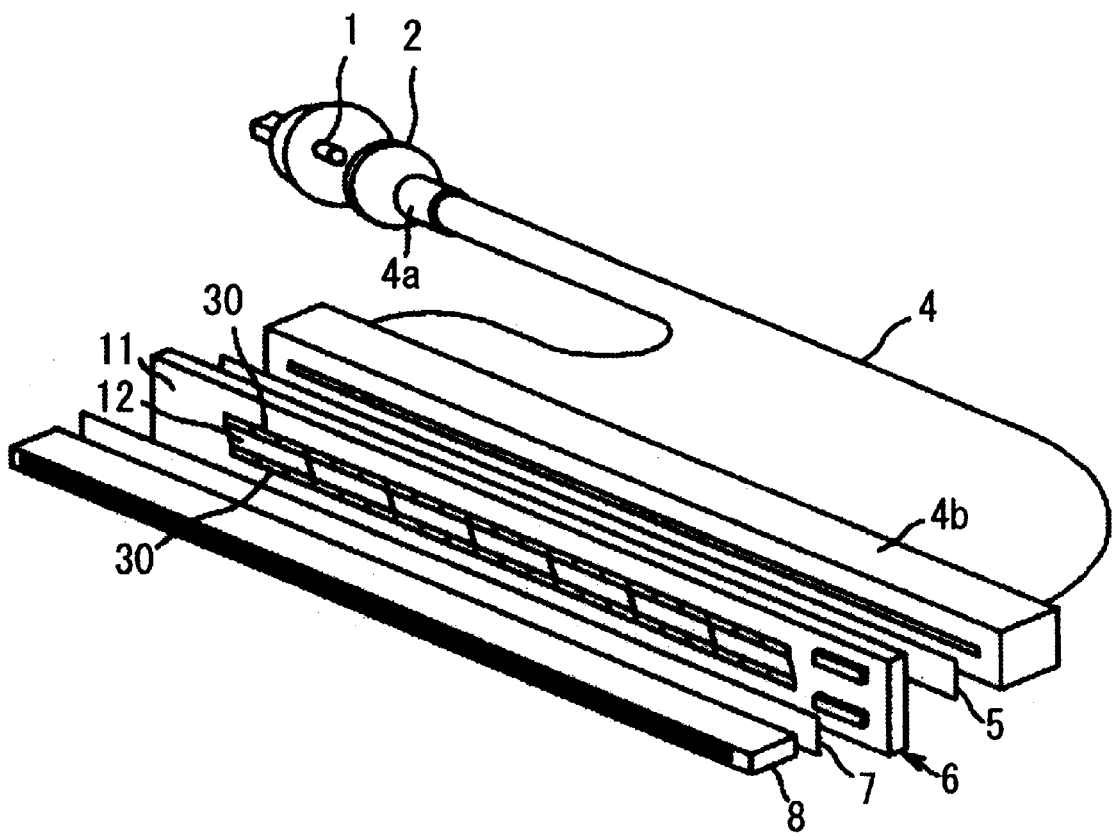
FIG. 1 is a perspective view showing the basic construction of a light shutter device in which the driving method pertaining to the present invention is applied.

(Light Shutter Device, See FIG. 1)

First, FIG. 1 shows the overall construction of the light shutter device in which the driving method pertaining to the present invention is applied. This light shutter device comprises a light source (halogen lamp) 1, a heat absorbing filter 2, an optical fiber array 4, a polarizer 5, a light shutter module 6, an analyzer 7, and an image-forming lens array 8.

The optical fiber array 4 comprises many optical fibers bound together. The light emitted from the light source 1 irradiates the entry end 4a via the heat absorbing filter 2 and exits the optical fiber array 4 via the other end 4b in a straight-line fashion. The polarizer 5 and analyzer 7 are arranged in a cross-Nicol fashion such that each plane of polarization is angled 45 degrees relative to the electrical field applied to each light shutter element.

(Construction of Light Shutter Module)

Figure 10:
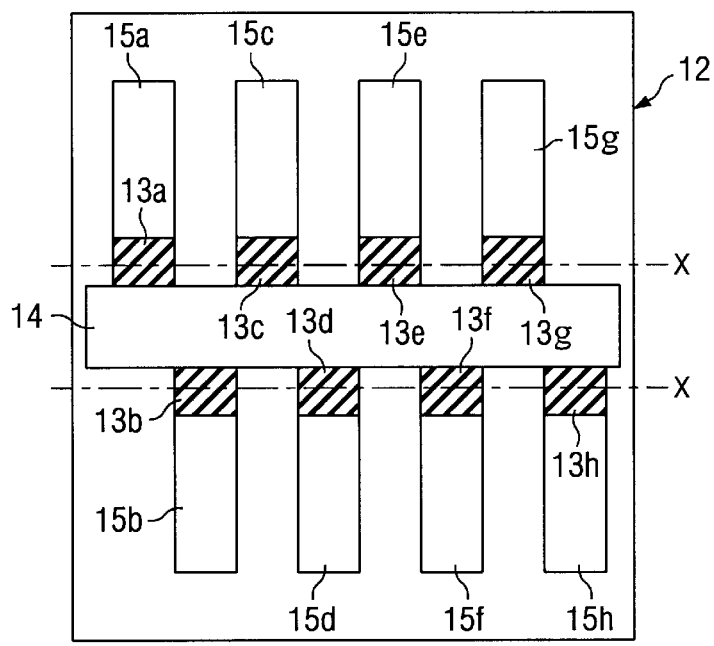
FIG. 10 is a plan view showing a conventional light shutter chip (which is also the light shutter chip in which the first or second embodiment of the driving method pertaining to the present invention is applied)

The light shutter module 6 comprises multiple light shutter chips 12 made of PLZT and drive circuits (driver ICs) 30 arranged on a ceramic or glass substrate 11 having a slit opening. The electrodes 14 and 15 on the light shutter chip 12 are constructed such that one line of image data is output from the light shutter elements 13 arranged on two lines X, X, as shown in FIG. 10 for example.

In other words, the light shutter elements 13 (13a, 13b . . . ) form a one-dimensional image when they are turned ON/OFF by line X such that the two rows along the lines X, X form a one-line image. A two-dimensional image is formed on the photoreceptive surface by synchronizing the ON/OFF driving of each line X to the movement of the photoreceptive surface.

As specifically explained below, various different arrangements or constructions may be used regarding the light shutter elements in addition to that shown in FIG. 10.

(Drive Circuit)

Figure 2:
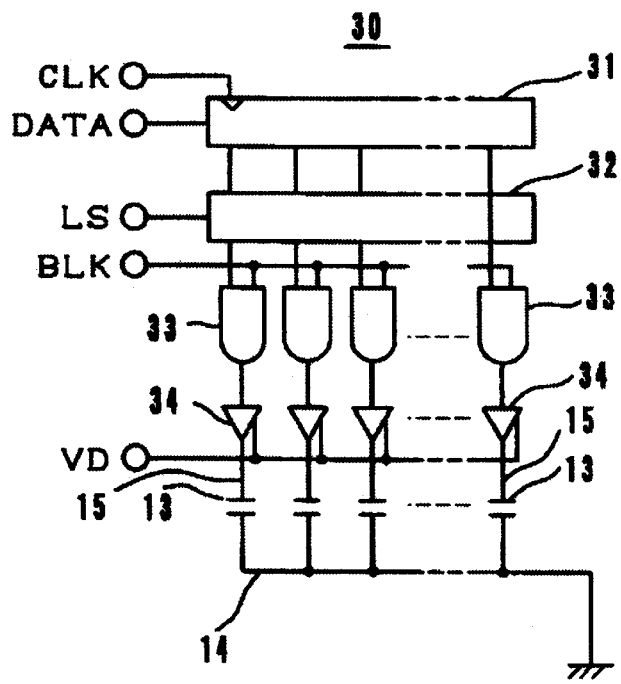
FIG. 2 is a block diagram showing the driver IC for the light shutter elements incorporated in the above light shutter device.

The driver IC 30 that drives the light shutter elements 13 comprises, as shown in FIG. 2, a shift register 31, a latch circuit 32, and AND gates 33 and high-voltage drivers 34 that correspond to each element 13.

Image data DATA is transferred to the shift register 31 in synchronization with a clock signal CLK, and is latched to the latch circuit 32 when a latch strobe signal LS becomes ON. Based on the ON/OFF status of the image data DATA and the signal BLK, a high-level voltage VD drawn via each AND gate 33 is applied to each element 13 in a pulse form from each high-voltage driver 34 via each individual electrode 15.

Figure 3:
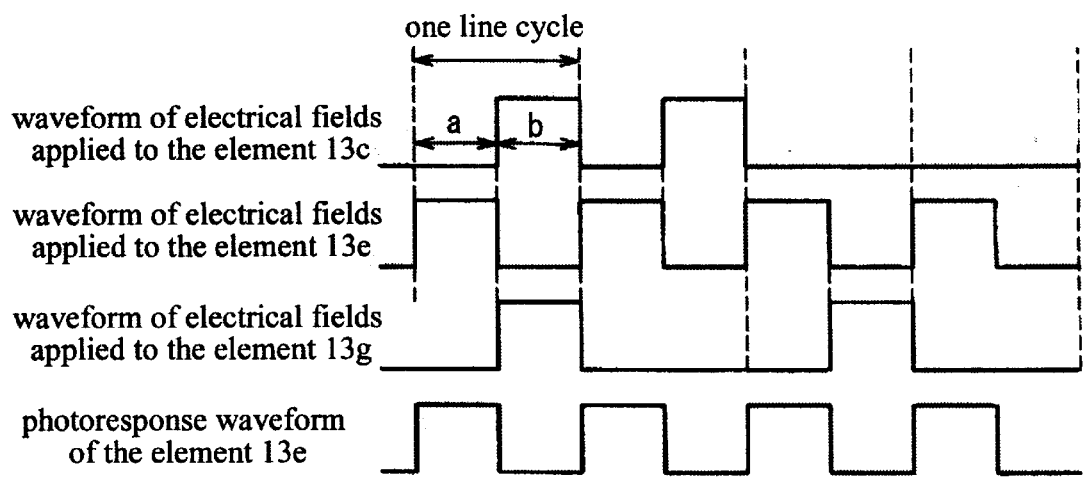
FIG. 3 is a chart showing the waveforms of the applied electrical fields and the photoresponse waveform of the target element in a first embodiment of the driving method pertaining to the present invention.

(First Embodiment, See FIG. 3)

The first embodiment of the driving method pertaining to the light shutter device having the above construction will now be explained with reference to FIG. 3.

Figure 11:
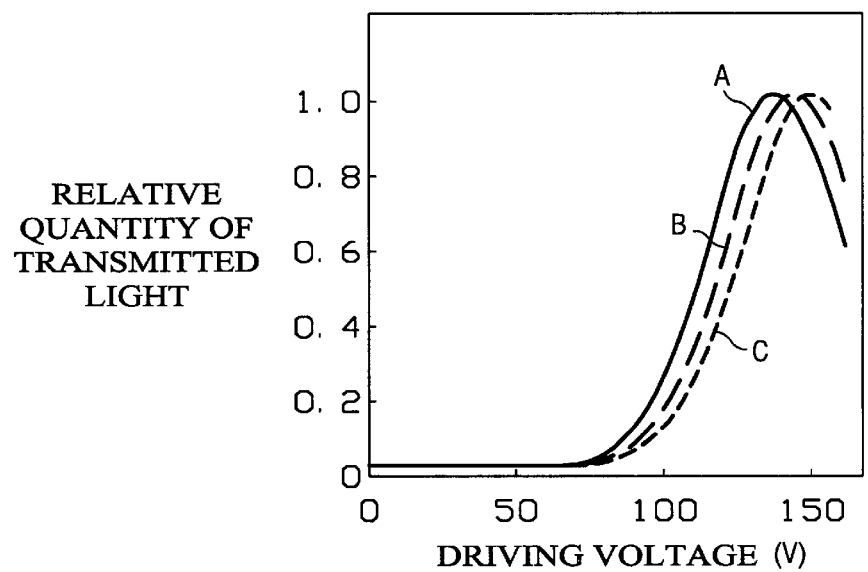
FIG. 11 comprises graphs showing the relationships between the voltage applied to the light shutter element and the amount of pass-through light passing therethrough when adjacent elements are ON and when they are OFF.

FIG. 3 shows the waveforms of electrical fields applied to the elements 13c, 13e and 13g when the light shutter elements are driven based on the same image data explained with reference to FIG. 12, as well as the photoresponse waveform of the element 13e. The elements 13c, 13e and 13g are the elements that were referred to previously as an example of elements that induce cross-talk in each other. In this first embodiment, the image draw cycle for one line is divided into two periods, i.e., (a) and (b), and the elements 13c, 13e and 13g are turned ON at different times such that they are not ON at the same time. The voltage applied to each element is the half-wavelength voltage (approximately 155V) used when the element 13e is turned ON on its own, as shown in FIG. 11.

When the one line cycle is divided into (a) and (b) and the adjacent elements are driven such that they are not turned ON at the same time as described above, no matter how the drive pattern of each element changes based on the image data, the crosstalk phenomenon does not take place, and a constant amount of pass-through light may be obtained from each element at all times.

Figure 12:
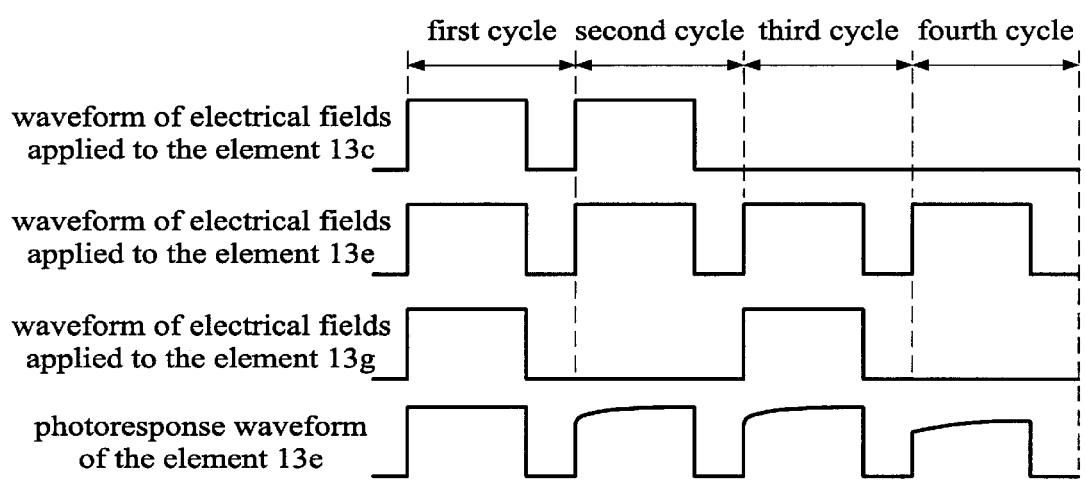
FIG. 12 is a chart showing the waveforms of applied electrical fields and the photoresponse waveform of the target element in the conventional driving method.

Using the drive of the first embodiment, when the driver IC 30 shown in FIG. 2 is used, the drive frequency is set to be double the conventional frequency shown in FIG. 12, and the image data to be output is expanded for each cycle. Dummy image data (image data based on which the element does not as a practical matter operate) may be supplied to elements that are not to be operated. Alternatively, two driver ICs may be used, such that adjacent elements are connected to different ICs and a different signal BLK may be input to each IC. Even when one driver IC 30 is used, if multiple signals BLK may be input, driving may be performed in synchronization with a different signal BLK for each output bit.

Figure 4:
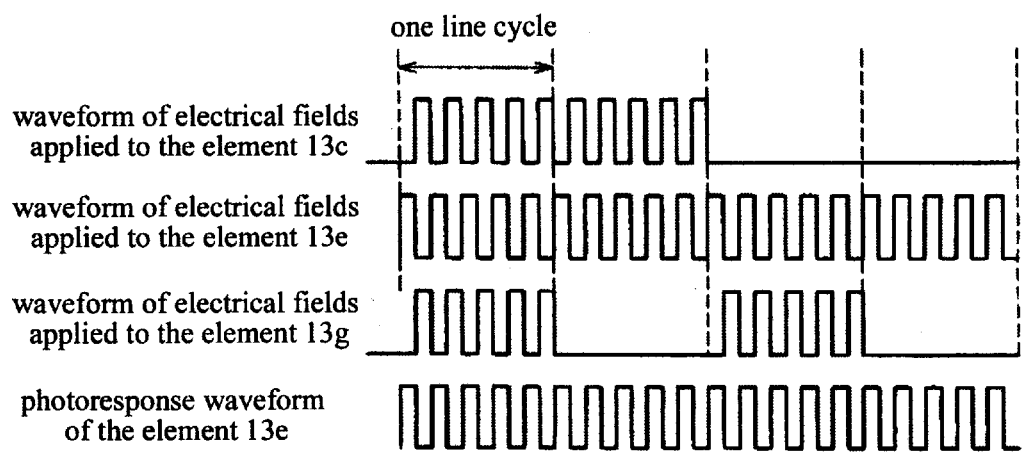
FIG. 4 is a chart showing the waveforms of the applied electrical fields and the photoresponse waveform of the target element in a second embodiment of the driving method pertaining to the present invention.

(Second Embodiment, See FIG. 4)

Incidentally, in the first embodiment described above, because adjacent elements do not turn ON at the same time, minute discrepancies may occur in the one line image on the photoreceptive surface. A driving method that can prevent such image discrepancies will be explained as a second embodiment with reference to FIG. 4.

In the second embodiment, as shown in FIG. 4, many pulses are supplied in one line cycle (it is preferred that the number of pulses comprise an even number), and the pulses are allocated such that adjacent elements are not simultaneously turned ON. In other words, driving is carried out such that even when adjacent elements are turned ON at the same time in terms of pixels, in a 'micro' sense, they are turned ON in an alternate fashion.

Figure 5:
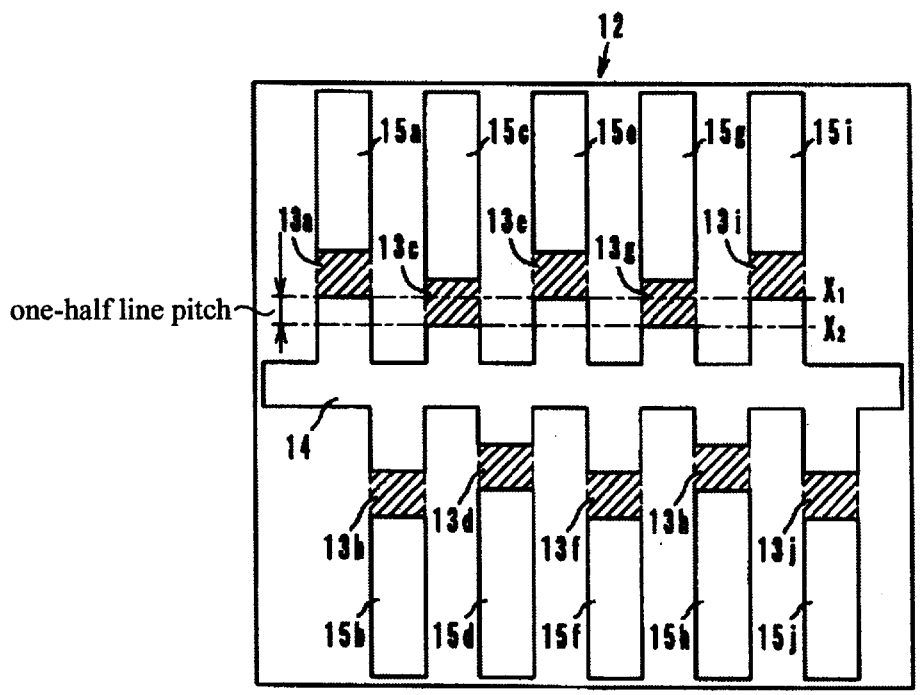
FIG. 5 is a plan view showing the light shutter chip in which a third embodiment of the driving method pertaining to the present invention is applied.

(Third Embodiment, See FIG. 5)

In the second embodiment described above, however, the drive frequency increases, which leads to an increase in power consumption and a need for a high-speed driver. A driving method that can resolve such problems as well as the minute image discrepancies described in regard to the first embodiment will be explained as a third embodiment with reference to FIG. 5.

FIG. 5 shows the construction of the elements of a light shutter chip 12 used in the third embodiment. In this embodiment, the light shutter elements are arranged on the lines X1 and X2 while adjacent light shutter elements are offset from each other by a one half line pitch on each side of the common electrode 14. The waveforms of the electrical fields applied to each element are the same as in the first embodiment shown in FIG. 3.

Figure 6:
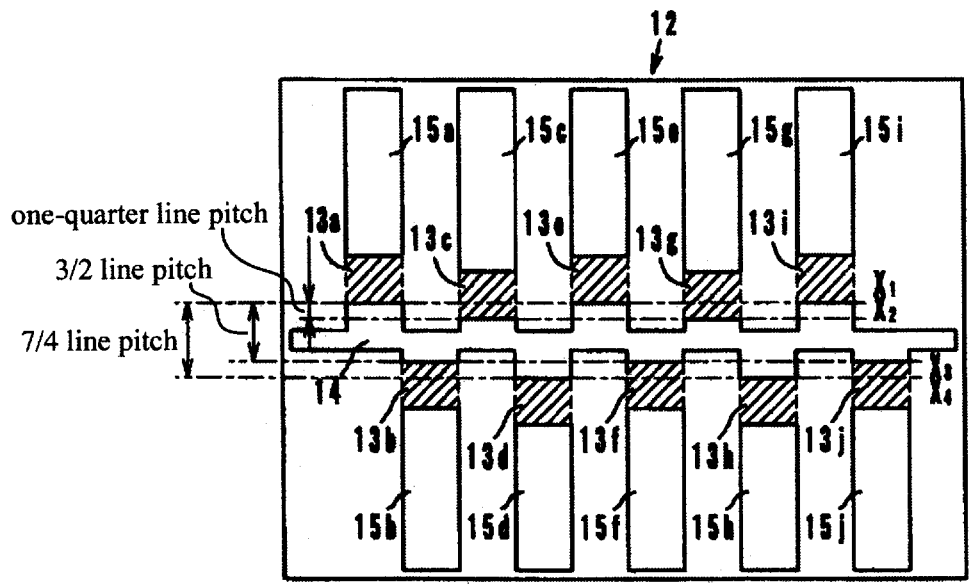
FIG. 6 is a plan view showing a light shutter chip in which a fourth embodiment of the driving method pertaining to the present invention is applied.
Figure 7:
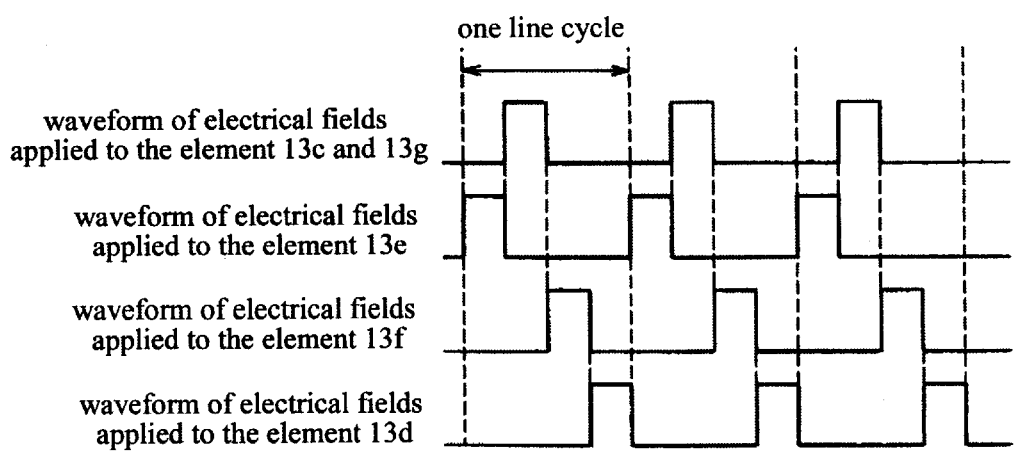
FIG. 7 is a chart showing the waveforms of applied electrical fields in the fourth embodiment of the driving method pertaining to the present invention.

(Fourth Embodiment, See FIGS. 6 and 7)

The fourth embodiment is a driving method used when, due to the narrowness of the common electrode 14, crosstalk occurs not only between the element 13e and the adjacent elements 13c and 13g, but also between the element 13e and the nearby elements 13d and 13f that face it across the common electrode. Focusing en the element 13e once more, driving is carried out such that the elements 13c through 13g that generate cross-talk do not turn ON simultaneously. FIG. 7 shows the waveforms of the electrical fields applied to the elements 13c through 13g when the light shutter elements are driven in this fourth embodiment.

The arrangement of the elements 13 shown in FIG. 6 eliminates the minute image discrepancies that are generated due to the differences in the turning ON of the elements that affect each other through cross-talk. In other words, the image draw line is divided into X1, X2, X3 and X4, and X1 and X2 or X3 and X4 are set to be offset from each other by a one-quarter line pitch, X1 and X3 are offset from each other by 3/2 line pitch and X1 and X4 are offset from each other by a 7/4 line pitch across the common electrode 14.

Figure 8:
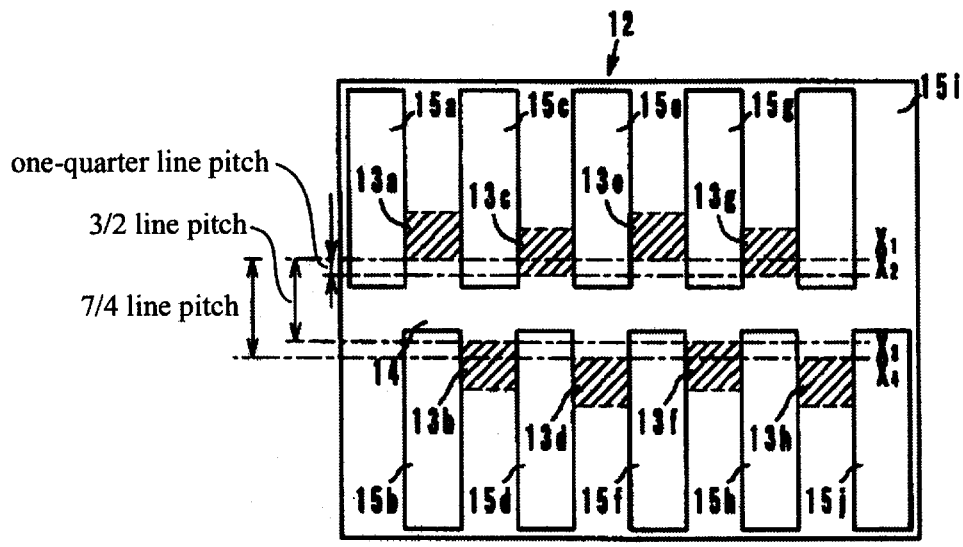
FIG. 8 is a plan view showing a light shutter chip in which a fifth embodiment of the driving method pertaining to the present invention is applied.
Figure 9:
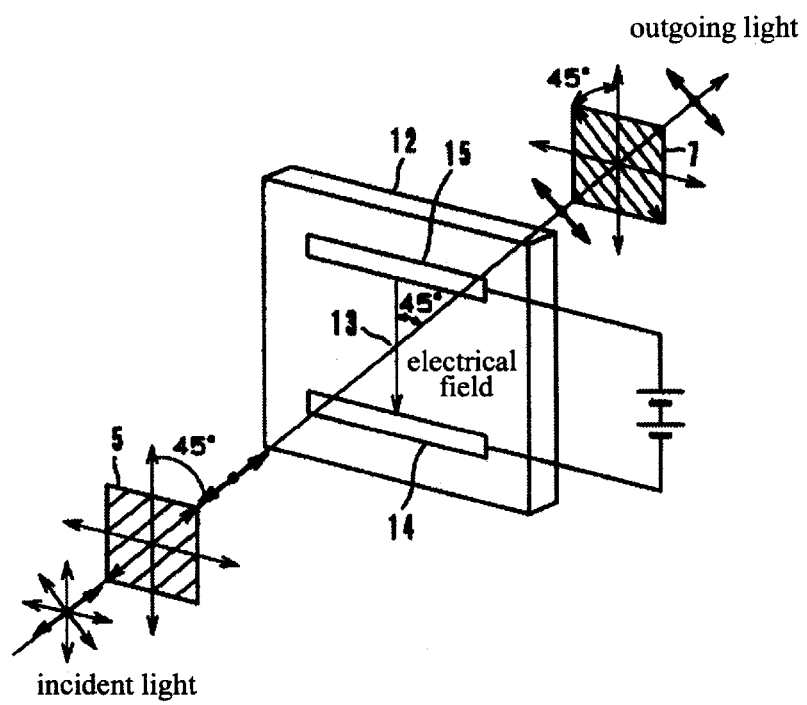
FIG. 9 is a perspective view showing the operation principle of a light shutter element made of PLZT.

(Fifth Embodiment, See FIG. 8)

The fifth embodiment comprises a driving method for the light shutter chip 12 in which no common electrodes are used as shown in FIG. 8. In this case, each light shutter element 13 is turned ON when a difference in potential is generated between two opposite individual electrodes 15 and is turned OFF when there is no such potential difference. In other words, the element 13e turns ON when there is a potential difference between the individual electrodes 15e and 15g.

Therefore, whether or not a voltage is to be applied to each individual electrode 15 is determined depending on the presence of image data for the elements 13 that share each individual electrode 15. Focusing on the element 13e, the nearby elements 13d and 13f, as well as the adjacent elements 13c and 13g, affect the element 13e, and vice versa, through crosstalk. Consequently, as in the fourth embodiment, driving is carried out such that the elements 13c through 13g that can cause and experience mutual cross-talk are not turned ON at the same time (see FIG. 7).

Furthermore, in the fifth embodiment, the elements 13 are arranged on either one of the lines X1, X2, X3 and X4, while the pitch of each line is set to be the same as in the fourth embodiment, such that minute image discrepancies may be prevented.

If the elements 13d and 13f were located at a sufficient distance from the element 13e to avoid cross-talk, there would be no problems even if all of these elements were simultaneously turned ON. However, because having a large distance between the element 13e and the element 13d or 13f would burden the illumination system and image forming system and increase the cost of manufacture due to the increase in the memory capacity in which image data is expanded, it is preferred that they be located as close together as possible. This is the reason that the cross-talk countermeasure of the present invention is useful.

(Other Embodiments)

The light shutter device driving method pertaining to the present invention is not limited to the embodiments described above, but may be varied within the essential scope of the invention. In particular, any construction may be used for the overall construction of the light shutter device and details of the light shutter module, or for the construction of the driver circuit.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A light shutter device comprising:
a substrate made of a material with an electro-optical effect;
a plurality of electrodes on the substrate;
a plurality of light shutter elements which are located between the electrodes and which are driven by application of a voltage between the electrodes, wherein the shutter elements form a shutter array which extends in a specified direction; and
a driver for driving the light shutter elements,
wherein an electrical field applied by the driver does not operate essentially simultaneously on light shutter elements as to which a cross-talk phenomenon occurs in their respective electrical fields.

2. A light shutter device according to claim 1,
wherein the driver divides one cycle into at least two periods and the driver turns the light shutter elements that experience mutual cross-talk on alternately in each period, said one cycle corresponds to a term in which one line shutter array is driven.

3. A light shutter device according to claim 2,
wherein the shutter array includes plurality of rows of the light shutter elements.

4. A light shutter device according to claim 3,
wherein the shutter array includes two rows of the light shutter elements and the two rows are arranged at a 1/2 line pitch difference.

5. A light shutter device according to claim 1,
wherein the driver supplies a large number of pulses per line cycle and the driver turns the light shutter elements that experience mutual cross-talk on alternately by each pulse.

6. A light shutter device according to claim 1,
wherein the driver drives the light shutter elements such that adjacent elements are not turned ON at the same time.

7. A light shutter device according to claim 6,
wherein the driver divides one cycle into at least two periods and the driver turns the adjacent light shutter elements on alternately in each period, said one cycle corresponds to a term in which one line shutter array is driven.

8. A light shutter device according to claim 7,
wherein the shutter array includes two rows of the light shutter elements and the two rows are arranged at a 1/2 line pitch difference.

9. A light shutter device according to claim 1,
wherein the driver supplies a large number of pulses per line cycle and the driver turns the adjacent light shutter elements on alternately by each pulse.

10. A light shutter device according to claim 1,
wherein the driver drives the light shutter elements alternately in every other shutter elements.

11. A light shutter device according to claim 10,
wherein the driver divides one cycle into at least two periods and the driver turns the light shutter elements on alternately in every other shutter elements in each period, said one cycle corresponds to a term in which one line shutter array is driven.

12. A light shutter device according to claim 11,
wherein the shutter array includes two rows of the light shutter elements and the two rows are arranged at a 1/2 line pitch difference.

13. A light shutter device according to claim 1,
wherein the driver supplies a large number of pulses per line cycle and the driver turns the light shutter elements on alternately in every other shutter elements by each pulse.

14. A driving method for a light shutter device including multiple light shutter elements located on a substrate made of a material having an electro-optical effect, wherein the ON/OFF control of light is carried out through action of an electrical field, generated from a pair of electrodes, on each light shutter element, said method comprising the steps of:
(a) driving a first group of the light shutter elements; and
(b) driving a second group of the light shutter elements, wherein driving said second group of the light shutter elements at a same time of driving the first group of light shutter elements leads to a cross-talk phenomenon with respective electrical fields of light shutter elements of the first group of light shutter elements and the second group of light shutter elements,
wherein said steps of (a) and (b) are repeated alternately.

15. A driving method for a light shutter device according to claim 14,
wherein one cycle corresponding to a term in which one line shutter array is driven are divided into at least two periods and the steps of (a) and (b) are repeated alternately by each period.

16. A driving method for a light shutter device according to claim 15,
wherein the shutter array includes two rows of the light shutter elements and the two rows are arranged at a 1/2 line pitch difference.

17. A driving method for a light shutter device according to claim 14,
wherein a large number of pulses are supplied per line cycle corresponding to a term in which one line shutter array is driven and the steps of (a) and (b) are repeated alternately by each pulse.

18. A driving method for a light shutter device including multiple light shutter elements located on a substrate made of a material having an electro-optical effect, wherein the ON/OFF control of light is carried out through action of an electrical field, generated from a pair of electrodes, on each light shutter element, said method comprising the steps of:
(a) driving a first group of the light shutter elements;
(b) driving a second group of the light shutter elements; and
(c) repeating the steps of (a) and (b) alternately such that light shutter elements that are next to each other are not turned ON at the same time.

19. A driving method for a light shutter device according to claim 18,
wherein a large number of pulses are supplied per line cycle corresponding to a term in which one line shutter array is driven and the steps of (a) and (b) are repeated alternately by each pulse.

20. A driving method for a light shutter device including multiple light shutter elements located on a substrate made of a material having an electro-optical effect, wherein the ON/OFF control of light is carried out through action of an electrical field, generated from a pair of electrodes, on each light shutter element, said method comprising the steps of:

(a) driving a first group of the multiple light shutter elements, wherein said light shutter elements of the first group are arranged in every other shutter element on a line of the multiple light shutter elements;

(b) driving a second group of the multiple light shutter elements, wherein said light shutter elements of the second group are remaining light shutter elements of the multiple light shutter elements on the line; and (c) repeating the steps of (a) and (b) alternately.

* * * * *

UNITED STATES PATENT AND TRADEMARK OFFICE
CERTIFICATE OF CORRECTION

PATENT NO. : 6,561,703 B2
DATED : May 13, 2003
INVENTOR(S) : Tomohiko Masuda et al.

It is certified that error appears in the above-identified patent and that said Letters Patent is hereby corrected as shown below:

<u>Title page,</u>
Item [30], Foreign Application Priority Data, delete "May 26, 2000", and insert -- April 26, 2000 --.

Signed and Sealed this

Twenty-third Day of March, 2004

JON W. DUDAS
*Acting Director of the United States Patent and Trademark Office*